Jan. 28, 1941. J. S. PECKER 2,230,013
CENTRIFUGAL SEPARATING EQUIPMENT
Original Filed May 4, 1936 5 Sheets-Sheet 3

INVENTOR
Joseph S. Pecker
BY
Lynnestvedt & Lechner
ATTORNEYS

Jan. 28, 1941.   J. S. PECKER   2,230,013
CENTRIFUGAL SEPARATING EQUIPMENT
Original Filed May 4, 1936   5 Sheets-Sheet 4

INVENTOR.
Joseph S. Pecker

Jan. 28, 1941.  J. S. PECKER  2,230,013
CENTRIFUGAL SEPARATING EQUIPMENT
Original Filed May 4, 1936   5 Sheets-Sheet 5

INVENTOR.
BY Joseph S. Pecker
Synnestvedt & Lechner
ATTORNEYS

Patented Jan. 28, 1941

2,230,013

UNITED STATES PATENT OFFICE 2,230,013

CENTRIFUGAL SEPARATING EQUIPMENT

Joseph S. Pecker, Philadelphia, Pa., assignor to American Centrifugal Corporation, New York, N. Y., a corporation of Delaware Application May 4, 1936, Serial No. 77,728
Renewed September 6, 1939

2 Claims. (Cl. 233—46)

This invention relates to centrifugal separating equipment, the equipment being particularly adapted for use in connection with the centrifugal separation of solids and colloids from a liquid. While the equipment may be applied to the treatment of various different materials, it is particularly adapted to the treatment of liquids mixed with solids and colloids of several different types. Additionally, the equipment is particularly adapted to the treatment of liquids containing such solids and colloids of specific gravity closely approximating that of the liquid. For example, the equipment is especially useful for the treatment of sewage in which the liquid is mixed with solids and colloids usually having a specific gravity ranging from 1.004 to 1.08. It is therefore apparent that very high centrifugal intensities are nesessary in overcoming the viscosity of the liquid and producing effective separation. Sludge of this general nature presents still another problem which the equipment is arranged to take care of, i. e., the presence of solid particles of different physical characteristics, some being very finely subdivided and others of a fibrous nature, the fibers varying in length.

At the outset, it is further noted that while various features of the invention may be applied to a mechanism incorporating a centrifugal basket rotating in any desired position, in the preferred form of the mechanism the basket is arranged for rotation on a substantially vertical axis, as illustrated in the drawings.

One of the principal objects of the invention is concerned with increasing the overall efficiency of a centrifugal separating machine of given capacity. Stated in another way, the invention provides for more thorough separation of liquids from solids within a given period of time of operation. Conversely a predetermined drying or separating action may be brought about in accordance with this invention within a shorter time interval than has been possible heretofore.

Another object of the invention is to provide for separation as between solids or colloids of different specific gravities or different physical characteristics such as particle size, the equipment being arranged so as to separate the solids of different characteristics and deposit the same in separate compartments or chambers of the centrifugal basket.

In connection with the object referred to just above, the invention further has in view so proportioning the several compartments that the volume thereof approximately corresponds to the percentage of the several different types of solids or colloids contained in the sludge treated.

In accordance with the invention, the feed of sludge to the separating basket is arranged so that sludge is first delivered to the compartment in which the heaviest solids are in large part deposited. After at least some separation of the heavier solids or larger particles in this first compartment, the liquid with additional solids is caused to flow to the second separation chamber, and from there to a third, if desired, or even to additional chambers, depending upon the nature of the materials being treated and the desired degree of separation as between solids.

Still further, the invention provides novel means for the removal of the compacted solids from the various compartments of the basket, this means being of different construction in the different compartments. That is, the means for removing the solids from one compartment are so constructed as to effect removal of that type of solids to the best advantage, the means in another compartment being constructed differently so as to provide effective removal of the type of solids compacted therein.

Another object of the invention is concerned with a novel seepage means for discharging the effluent from the basket. One feature of the improved seepage means is self-cleaning action, which is provided by virtue of the arrangement thereof so that centrifugal force incident to rotation of the basket is employed to expel any solids which may from time to time become lodged in the seepage passages.

In accordance with another aspect of the invention, provision is made for discharging the effluent from the basket in a manner to reduce the power input necessary to drive the basket.

In addition to all of the foregoing, the invention provides a number of novel structural features and advantages, many of which will be mentioned hereinafter.

With further reference to the first object noted above regarding increase in efficiency, particularly with respect to the time required to effect a given degree of separation, it is here mentioned that the manner in which this is accomplished will be more fully elaborated herebelow in connection with the description of the accompanying drawings.

How the foregoing and also other objects and advantages are attained will appear more fully from the following description referring to the drawings, in which—

Figure 1:
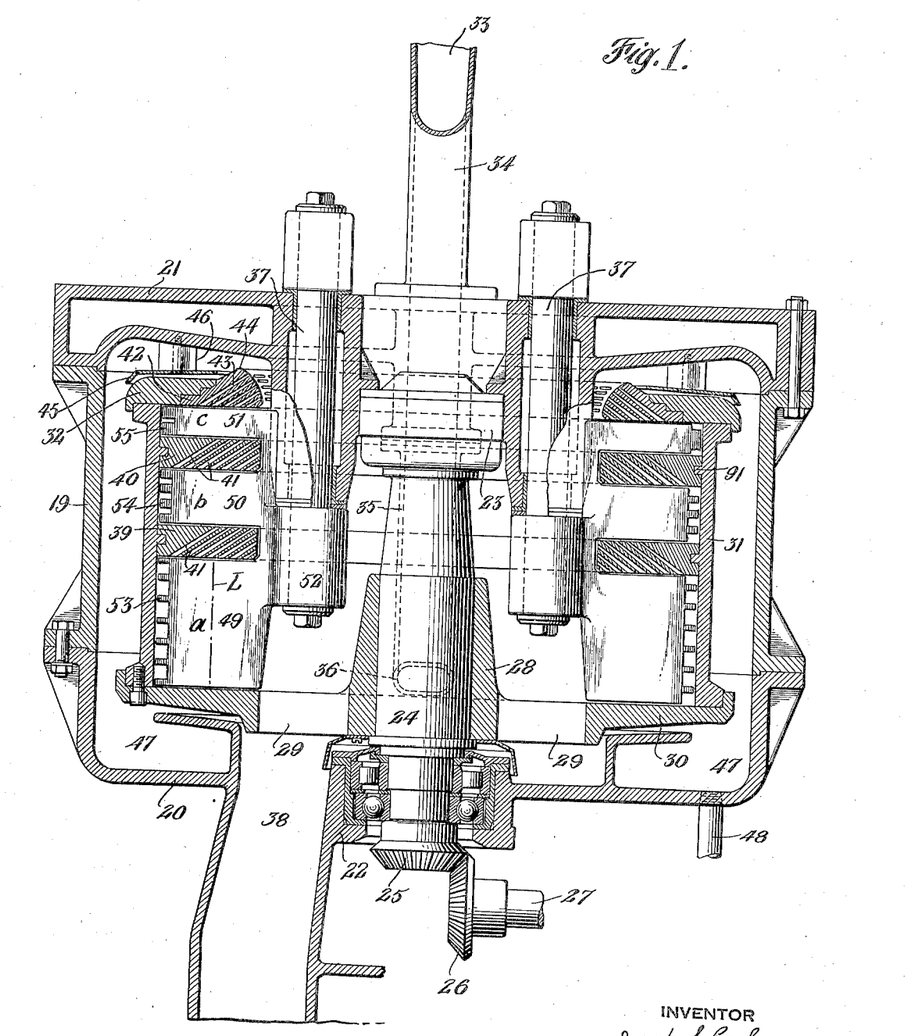
Figure 1 is a vertical sectional view through a portion of a centrifugal machine incorporating a number of the important features of this invention.
Figures 2, 3:
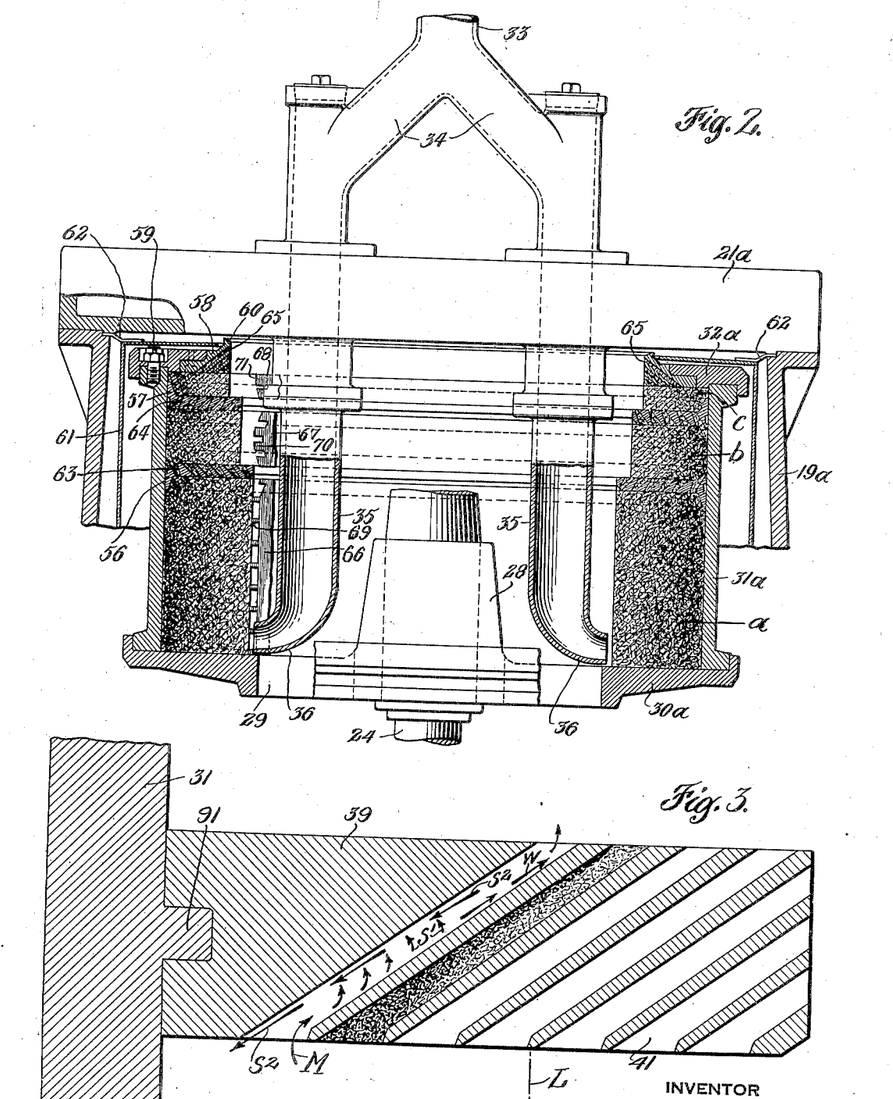
Figure 2 is another vertical sectional view through a portion of a machine of somewhat modified construction, the view being taken substantially at right angles to Figure 1.
Figure 3 is an enlarged fragmentary sectional view of a portion of the equipment shown in Figure 1, this view being arranged to illustrate certain principles of operation embodied in equipment constructed in accordance with the invention.

The general nature of the equipment will best be understood from an examination of Figures 1 and 2. In Figure 1 a casing 19 of generally cylindrical shape provides a chamber in which the basket is adapted to rotate, this chamber being closed at the bottom by another casing section 20 and at the top by a section 21, in the general manner illustrated in my copending application Serial No. 712,390, filed February 21, 1934, issued October 6, 1936 as Patent No. 2,056,885. The casing is, of course, suitably mounted on a base or the like (not shown) and serves to mount lower and upper bearings 22 and 23, the former of which is received in a socket formed in the lower casing part 20, and the latter of which is received in a socket formed in the upper casing part 21. The bearings surround and journal the main shaft or axle 24, the shaft being adapted to be driven by bevel gears 25 and 26 and drive shaft 27.

The basket includes a hub part 28 mounted on the shaft and having spokes 29 connected at their outer ends by an imperforate ring or annulus 30 which, in effect, constitutes the bottom wall of the basket. The upright cylindrical wall 31 of the basket is secured to the outer edge of the bottom ring 30 and at the upper edge of the basket a ring 32 may be provided not only for purposes of strengthening the unit, but also to, in part, define a top wall for the basket, with which the improved seepage means hereinafter to be described cooperates.

Casing and basket structure essentially similar to that described is also incorporated in the arrangement of Figure 2, including a casing wall 19a, top casing section 21a, bottom wall 30a of the basket, side wall 31a thereof, and top ring 32a. Figures 1 and 2 illustrate a suitable sludge feeding arrangement including a supply pipe 33 preferably branched as at 34—34, the branches being connected with upright pipe sections 35—35 which project downwardly to a point adjacent the bottom of the basket at which their outlet ends are curved outwardly at 36 and extended just beyond the inner edge of the bottom ring 30 or 30a, as clearly shown in Figure 2, this for the purpose of delivering the sludge substantially directly to the inner edge of the bottom ring of the basket. Division or branching of the sludge inlet is provided with a view to ensuring substantially symmetrical distribution of the sludge to the basket, thus avoiding possible unbalance.

Both of the arrangements shown in Figures 1 and 2 further include means for removing solids compacted in the basket, this means in both instances comprising a pair of generally upright shafts 37 which may desirably be mounted for rotation either in the top section 21 of Figure 1 or in the top section 21a of Figure 2. Scraper elements to be described more fully hereinafter are secured to the bottom ends of the rotatable shafts 37 so that by turning said shafts the scrapers may be moved toward and away from the inner wall of the basket.

The foregoing general features of the structure are representative of the type of machine to which the present invention is peculiarly well adapted. Machines of this general type are also illustrated in my prior applications Serial No. 712,390, filed February 21, 1934, (Patent No. 2,056,885) and Serial No. 759,302, filed December 26, 1934, issued May 18, 1937, as Patent No. 2,080,874. The general nature of the operation of such machines includes introduction of sludge through the inlet pipes during rotation of the basket, discharge of the effluent from the top edge of the basket, and subsequent cutting or shredding of the compacted solids by means of the scrapers, which solids are discharged downwardly between the spokes 29 and thereafter through suitable apertures 38 formed in the bottom part of the casing 20, as shown in Figure 1.

In accordance with this invention, means are provided for causing material introduced into the basket to flow through a plurality of passages of relatively restricted cross-section but of relatively great length. In Figure 1 such means includes a pair of rings 39 and 40 which are arranged to project inwardly from the inner surface of the cylindrical wall 31 of the basket. It is here noted that only one such ring may be adopted, or more than two may be used, depending upon the nature of the materials being treated and the degree of separation or drying desired.

The rings 39 and 40 of Figure 1 are essentially similar in construction, each being provided with a multiplicity of passages 41 extended therethrough at an angle, as clearly seen in Figures 1 and 3. The angle of extension or elongation of these passages is such that throughout at least a portion of the length thereof the passages extend toward and away from the axis of rotation of the basket. More specifically (referring to Figures 1 and 3), each passage 41 extends upwardly and inwardly toward the center of rotation of the basket. As will be brought out more fully hereinafter, these passages may also be inclined upwardly and outwardly and, in addition to the inclination toward and away from the axis, may further be inclined with respect to a vertical plane containing the axis of rotation of the basket. In all cases, however, the inclination at least includes a component lying in a vertical plane including the axis of rotation, this for reasons which will now be set out.

Separation of mixed materials having different specific gravities requires a period of time which is proportional to the depth of the mixed materials in which the separation is occurring. To illustrate, in a plain vessel subject to the action of gravity, a batch of mixed liquid and solid materials will require a period of time for separation or settlement of the solids to the bottom, which period of time is proportional to the depth of the mixed materials. Essentially the same principle is applicable to separation of solids from liquid under the influence of centrifugal force in a machine of the character here under consideration, the rate of separation, of course, being increased in accordance with the centrifugal intensity. Obviously, the specific gravity and viscosity of the liquid and the size, shape and specific gravity of the solid particles will affect the time necessary for separation with a given centrifugal intensity, but with any mixture the time will be proportional to the depth through which the separation is occurring.

With the foregoing in view, the invention provides for the passage of the mixed solid and liquid materials through a multiplicity of passages having a relatively small dimension in a direction paralleling the action of centrifugal force. The time interval necessary for separation of the solids in such a passage is reduced directly in proportion to the dimension of the passage paralleling the action of centrifugal force. Thus, a passage one quarter of an inch wide in a direction paralleling the action of centrifugal force will effect separation of the mixed materials therein in one-half the time necessary for separation in a passage having a corresponding dimension equal to one-half inch. In equipment of the general nature here involved, the basket is ordinarily designed to receive a peripheral wall or layer of mixed materials of about six inches in thickness. It will, therefore, be seen that with a passage having the one-quarter inch dimension referred to above (which is representative of the approximate dimensions preferably employed in accordance with this invention), the period of time necessary for separation of solids will be equal to one-twenty-fourth of the time necessary to effect separation through a layer six inches in depth.

The foregoing discussion is, of course, based on an assumed theoretically perfect condition, that is, in the absence of other factors which would reduce the theoretically perfect result.

The equipment of this invention, including rings such as those shown at 39 and 40 in Figures 1 and 3, provides for the flow of a large proportion of the mixed materials introduced through passages having a small dimension in a direction paralleling the action of centrifugal force. In consequence the efficiency of the machine, particularly with respect to time, is very materially improved.

The action which takes place is apparently substantially as follows (reference being made particularly to Figures 1 and 3):

Assume first the introduction of mixed materials as by the feed pipe 34 and delivery thereof onto the bottom annular wall 30 of the basket in Figure 1. The material introduced will, of course, initially form a peripheral layer in the bottom chamber a of the basket and when this layer is built inwardly sufficiently so that the materials enter the passages 41 toward the left in Figure 3, a separation of solids in said passages commences. The arrow M in Figure 3 indicates the flow of mixed materials into the extreme left-hand passage 41. The heavier materials, under the influence of centrifugal force, move to the left as suggested by the arrows $S^1$ and begin to collect on the outer face of the passage. The collecting materials, under the influence of centrifugal force, will then be caused to flow downwardly along the outer face, as indicated by the arrows $S^2$, for discharge into the lower compartment a of the basket while the partially clarified water or liquid will pass upwardly in the direction of the arrow W.

Upon building up of a partial solid wall and some clarified liquid in the compartment a to the depth indicated by the line L, the mixed materials (freed, of course, of some of the solids—the heavier solids) will begin to flow into the next chamber b of the basket, lying between the rings 39 and 40. This same action continues to take place with respect to all of the passages 41. A similar action also takes place in chamber b which delivers materials through the passages 41 of the ring 40 to the top of chamber c.

With reference to Figure 3 it will be noted that the second passage from the left is shown as having solid materials built up therein. This illustrates manner in which heavier solids, shown by the heavier stippling, will be deposited along the outer wall of the passages.

In consequence of this progressive or stage-by-stage separation, the heaviest and/or largest solids are deposited principally in chamber a, solids of an intermediate specific gravity and/or size being deposited principally in chamber b, and the remaining solids principally in chamber c.

Toward the end of a separation or purging period, the three chambers a, b, and c will become substantially filled with solids, the effluent, as before stated, passing off axially out of the top of the basket. It will be understood that the filling of the basket as described will include filling not only of the chambers themselves, but also of the passages 41 in the rings 39 and 40. Highly effective separation of liquids from solids occurs within the passages themselves, and from the foregoing it will, therefore, be seen that these passages not only serve for effective separation with respect to the materials which finally remain therein, but further that they materially aid the separating action with respect to a large proportion of the mixed materials which pass therethrough in flowing from chamber to chamber.

At the top of the basket a seepage means constructed to embody the same principles as the rings 39 and 40 is also provided. In Figure 1 a ring 42 is employed, this ring being mounted at the inner periphery of ring 32 which is positioned at the top edge of the cylindrical wall 31 of the basket. Passages 43, inclined similarly to the passages 41, are extended through the ring 42, so that separation of solids takes place even in the final seepage or discharge passages. The effluent, of course, flows out of the discharge (inner) ends of passages 43 and thereafter upwardly and outwardly to be thrown from the high point 44. A baffle 45 is preferably arranged to surround the high point 44, just below the level thereof, this baffle being non-rotative and mounted in any convenient manner as by means of brackets 46 secured to the casing part 21. The discharge of the effluent from the ring 44 located a substantial distance inwardly from the extreme periphery of the basket, and the provision of baffle 45, is of importance in order to reduce the power input necessary in operating the basket. This may be illustrated in the following manner.

If the effluent is to be discharged from the basket adjacent the extreme periphery thereof, the effluent will, of course, be moving substantially with the basket during its high speed rotation. The speed at which the effluent moves with the basket at an inner ring (for example, at ring 44) is considerably lower than the speed at the extreme periphery. Power is necessarily consumed in raising the speed of movement of the effluent, and discharge thereof from a point at which it is moving at a relatively low speed therefore reduces the power necessarily consumed. The baffle prevents contact of the effluent with the basket after discharge thereof.

The effluent may conveniently be collected in the trough 47 toward the bottom of the casing, from which it may be withdrawn in any suitable manner as by a pipe 48 and carried to a point of disposal.

In accordance with this invention, the scraper mechanism for removing compacted solids from the inner wall of the basket is divided into sections to project into the several compartments a, b and c of the basket. In Figure 1, three scraper sections 49, 50 and 51 are shown, these being positioned respectively in the compartments a, b and c and secured to a common hub 52 which is fixed on shaft 37 hereinbefore described and thus adapted to be moved, by turning the shaft, toward and away from the inside wall of the basket. Preferably a pair of scraper mechanisms are employed, one being positioned toward each side of the machine, as clearly shown in Figure 1.

In addition to division of the scraper into sections, each scraper section is preferably provided with shredding or cutting teeth 53, 54 and 55, respectively, so as to shred the material during its removal from the basket. As shown in Figure 1, the teeth 53 of the scraper section 49 are desirably of less width but greater spacing than the teeth on the remaining scraper sections, this for the reason that the nature of the material deposited in the lowermost section a of the basket is more fibrous, denser and heavier than the solids deposited in the upper compartments. In chamber b the teeth 54 are a little wider and spaced not quite as far apart as in chamber a, this being representative of the type of teeth best suited to remove the materials deposited in the second chamber. Finally in the uppermost chamber c the teeth 55 are quite wide and may, in fact, even be eliminated so that just a single scraper element projects into chamber c, this for the reason that the materials deposited in the last chamber, being lighter and not quite so thoroughly dewatered, may more advantageously be removed by a substantially uninterrupted scraper edge.

As seen in Figure 1, the teeth 53 on the bottom scraper section at one side of the machine are vertically offset from the teeth 53 of the bottom scraper section at the other side of the machine, this for the purpose of distributing the shredding action of the teeth to more effectively shred or cut the solids. A similar offset of the teeth is adopted for the other scraper sections.

Referring now to the arrangement shown in Figure 2, it will be noted that as in Figure 1 the basket is divided into three superimposed compartments, the rings or baffles for this purpose being designated by the numerals 56 and 57. The rings are again positioned so as to provide compartments of different volume, the largest being at the bottom and the smallest at the top. The rings 56 and 57, and also the seepage ring 58 in this form are further stepped back so as to reduce the radial dimension of the intermediate and top chambers. This illustrates another way in which the volume of the several chambers may be varied. The material in chamber b will not build up beyond the inner periphery of the ring 57 since at this point an overflow into chamber c occurs, and similarly material will not build up in chamber c beyond the inner periphery of the seepage ring 58, since at this point the effluent will be discharged therefrom.

Note that in the arrangement of Figure 2, as in the arrangement of Figure 1, the effluent is again discharged from the basket at a point spaced inwardly from the periphery thereof, this for the purpose of conserving power. A baffle 59 surrounds the upper ring 60 of the seepage means and cooperates therewith in ensuring discharge of effluent in a manner to avoid re-contact with the outside walls of the basket. In Figure 2, the upper baffle 59 and also a cylindrical baffle 61 surrounding the basket and projecting a substantial distance downwardly from the top edge, provides substantially complete protection against contact of the effluent with the basket. These baffles may be supported by brackets 62 which may conveniently be clamped between the sections of the casing identified 19a and 21a.

Figure 2 further illustrates a modification of the arrangement of passages formed in the annular members 56 and 57. Here it will be seen that the passages 63 in the member 56 are inclined in the opposite direction from passages 64 in member 57, with respect to a horizontal plane.

The showing of Figure 2 further illustrates the manner in which the solids are built up in the three chambers a, b and c and how they are, at the end of the normal period of operation, compacted even within the passages 63 and 64 as well as in the passages 65 formed in the seepage ring 58. Sections 66, 67 and 68 of a scraper mechanism appear toward the left in Figure 2, these sections again being provided with teeth 69, 70 and 71 which are again of varying width and spacing, such as most effectively to shred, cut or scrape the solids of the type deposited in each chamber of the basket.

At this point reference is made to certain features of the operation of the mechanism thus far described. Upon the building up of solids in the several compartments of the basket (for example, to the levels indicated in Figure 2) the feed of material through the inlet pipe 33 and the branches 36—36 is stopped. The speed of rotation of the basket is then preferably brought down to a relatively low value, during which the scrapers are advanced toward the inner peripheral wall of the basket so as to shred and remove the material compacted in the chambers, this material being drawn inwardly by the scrapers to drop by gravity between the spokes 29 of the basket and from there through apertures 38 formed in the bottom of the casing (see Figure 1). Upon removal of the solids in this way, the speed of the basket may then be increased and, upon the attainment of a reasonable rate, the action of centrifugal force will serve to expel the solids deposited within the passages in the rings between the chambers. With respect to this matter it is noted that it is of great importance to employ passages which are inclined toward and away from the axis of rotation. Such inclination results in effective and complete discharge of solids therefrom under the influence of centrifugal force. The solids thus expelled are deposited in the several chambers of the basket and will, of course, be scraped out during the next scraping operation.

Increase in speed of rotation following the scraping operation also discharges the solids deposited in the passages of the seepage ring.

With further reference to the passages in the members dividing the basket into chambers and also in the seepage ring, note that in Figures 1 and 2 all of the passages are of somewhat tapered width. In the fabrication of baffle or seepage members as by casting, the cores may much more readily be removed if the passages are tapered. The taper is provided chiefly for the purpose of facilitating manufacture in this way, but it should be noted that in all forms of the invention employing a tapered passage the larger end of the passage is positioned at a greater distance from the axis of rotation than the smaller end thereof. The importance of this lies in the fact that the tapered shape thus aids in facilitating discharge of solids under the action of centrifugal force, instead of opposing discharge, as would be the case were the small ends of the passages spaced a greater distance from the axis of rotation.

Some taper in the passages is also desirable from the standpoint of discharge of solids where the baffle or seepage members are formed by casting, for the reason that the inside passage wall, because of the fact that the member has been cast, is ordinarily somewhat rough. In the absence of some slight taper a tendency for the solids to adhere to these rough walls might prevent thorough discharge under the influence of centrifugal force.

Figure 10:
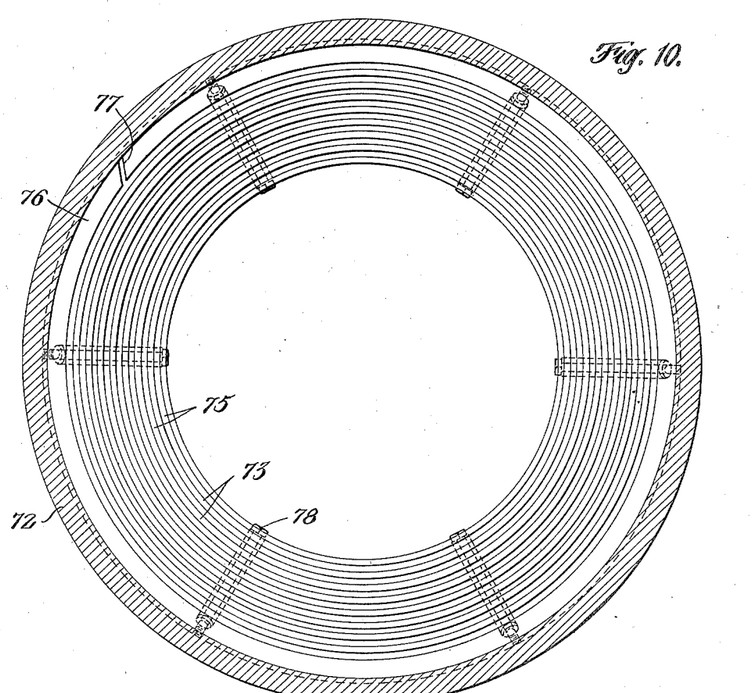
Figure 10 is a horizontal sectional view through a basket embodying another modification of the invention.
Figure 11:
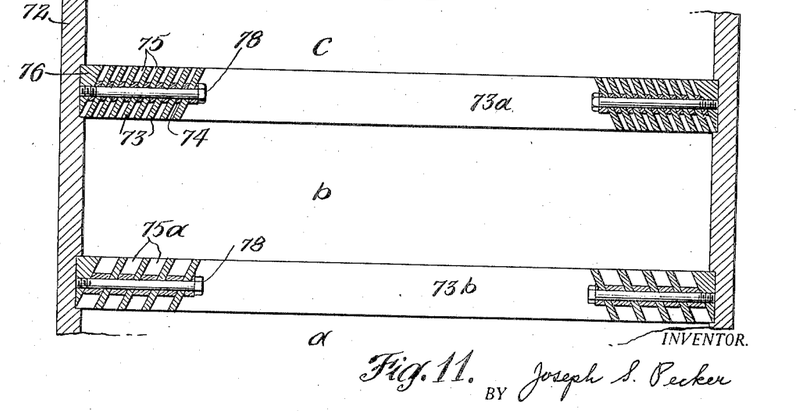
Figure 11 is a fragmentary vertical section of parts shown in Figure 10.

At this point reference is made to Figures 10 and 11. In these views the basket appears at 72 and a baffle member is shown applied to the inside of the basket, comprising a series of rings 73 each of conical shape, but progressively of smaller diameter from the basket wall toward the center, the rings being spaced from each other as by washers 74 so as to provide a multiplicity of passages or slot-like apertures of relatively narrow width. In this arrangement, the rings may be forged or otherwise fabricated and need not be cast, in view of which a smoother surface may more readily be obtained. The passages 75 are not of tapered thickness and need not have this shape, since effective discharge under the action of centrifugal force is assured without the taper.

For the purpose of mounting the rings shown in Figures 10 and 11, an outer ring 76 split as shown at 77 may be sprung into a groove formed in the inner peripheral wall of the basket. A plurality of bolts 78 extended through the rings and through their spacing washers 74 may serve to rigidly secure the rings in place in the manner clearly illustrated in Figure 11. The multiple ring arrangement just described is not only of especial advantage for the reasons already noted, but further since it affords very large total flow area in the passage 75.

Figure 11, it will be noted, includes a showing of two ring assemblies 73a and 73b which are spaced from each other in the basket to provide three chambers a, b and c. Ring 73b is of essentially the same construction as that described above in connection with ring 73a. The spacing 75a between the cones 73, however, is greater than in ring 73a. The purpose and advantage of this is related to the nature of the solids deposited in the several compartments a, b and c of the basket. The materials flowing through the passages of ring 73a, in accordance with the description of operation above, contain solids of specific gravity more closely approximating that of the liquid than the solids in the material flowing through the passages 75a of ring 73b. Because of this difference in specific gravity, thinner passages will result in separation of the finer solids in substantially the same time as is required for separation of the heavier solids flowing through passages 75a, provided the passages 75a are proportionately wider than the passages 75. In this way more uniform separation of solids of several different densities, size or shape is effected. It will be understood that the features described above i. e., the provision of passages of different widths in different rings, may be incorporated in other arrangements, for example, in the arrangements of Figure 1 and Figure 2.

Figure 4:
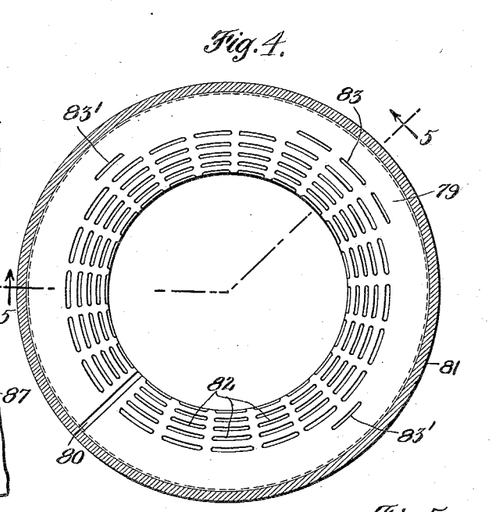
Figures 4 and 5 are horizontal sectional and vertical sectional views of a modified construction, Figure 5 being taken as indicated by the line 5—5 on Figure 4.
Figure 5:
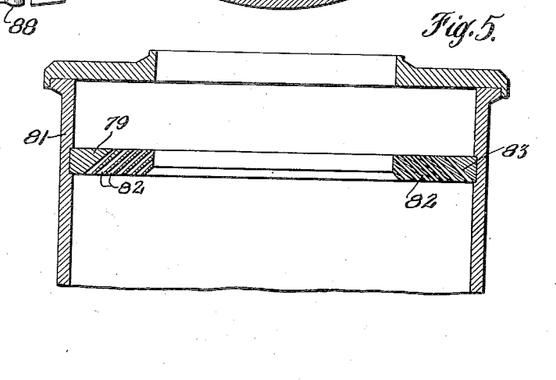

Figures 4 to 9 inclusive illustrate modifications in the mounting arrangements for the rings or baffles. In Figures 4 and 5 (similarly to ring 76 of Figures 10 and 11), the baffle ring 79 is split as shown at 80 and sprung into a suitable groove formed in the inside cylindrical wall 81 of the basket. The action of centrifugal force will, of course, aid in spreading the ring and maintaining a snug fit during operation.

The ring 79 is provided with a number of passages or slots 82 of a type similar to those already described above, for example, in connection with Figure 1, these passages being grouped in rings or series in a substantially symmetrical pattern about the axis of the basket. Passages 83 are preferably provided opposite to the split 80 to compensate for the difference in weight as between the side of the ring where the split 80 occurs and the diametrically opposite side thereof. Additional passages 83' may be provided for cross balancing. A completely balanced condition may thus be produced even when the ring is split.

Figures 6, 7, 8 and 9 illustrate another mounting arrangement in which the baffle ring is divided into a plurality of sections (three in this form) identified by the numeral 84. Each section is provided with groups of slots 82 and the three sections are fitted together in a ring at the inner surface of the basket wall 85. The sections may be secured in position by means of wedges 86 cooperating with inclined edges at the adjacent ends of the sections, these wedges being positioned so that the action of centrifugal force tends to tighten them. A bolt 87 passing lengthwise through the wedge is provided with an enlarged head 88 adapted to engage shouldered parts 89 of the ring sections. A nut 90 threaded on the inner end of the bolt bears against the wedge and thus serves to drive the wedge home. This action and also the action of centrifugal force tending to tighten the wedges, serves to expand the ring and thus securely hold it in place by tight frictional engagement with the inside surface of the cylindrical basket wall 85.

In connection with the arrangement just described, it should be noted that the rings of Figures 1 and 2 may be secured in place in essentially the same manner. Other methods may, of course, be adopted although I prefer arrangements of the type described since all of them eliminate the necessity for drilling the cylindrical wall of the basket, this being quite objectionable from the fatigue standpoint, particularly when a basket of fairly large diameter is employed and operated at a high R. P. M.

Figure 6:
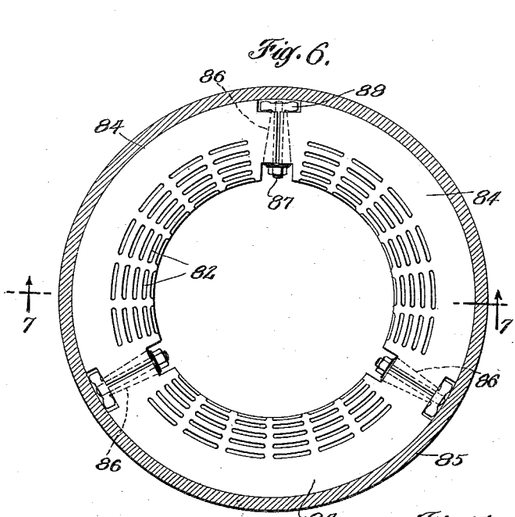
Figures 6 and 7 are views similar to Figures 4 and 5 of a further modification, Figure 7 being taken on the line 7—7 of Figure 6.
Figure 7:
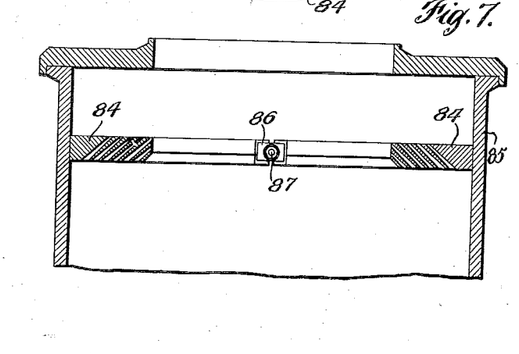
Figures 8, 9:
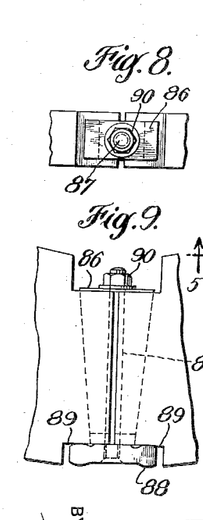
Figures 8 and 9 are fragmentary enlarged views showing certain details of the arrangement shown in Figures 6 and 7.

The arrangement of Figure 6 is of advantage over others since it permits adjustment of the position of the rings to meet different operating conditions.

Figures 1 and 3 illustrate a further modification of the ring mounting in which the cylindrical basket wall 31 is provided with an internal shoulder 31 fitting in a peripheral groove formed in the outer edge of the ring.

Turning again to the flow passages in the baffle members, it is noted that hereinbefore reference has already been made to several factors or characteristics of these passages, including elongation thereof, inclination in a direction toward and away from the axis of rotation, small dimension or width in a direction paralleling the action of centrifugal force, and tapered width. In addition, the flow passages may conveniently be of slotlike shape as clearly shown in Figures 4 and 6 or may even be substantially continuous, as in Figures 10 and 11. The passages may also take other shapes, an example of which appears in Figure 18 in which a portion of a ring 92 is shown as having reversely bent passages 92a. These passages thus each have portions extended at oppositely inclined angles with respect to a horizontal plane, i. e., a plane perpendicular to the axis of the basket. An advantage of this arrangement is that a more extended passage length may be provided in a ring of given width and thickness, as compared with Figure 1 and other similar arrangements.

Figures 12, 13, 14, 15, 16, 18:
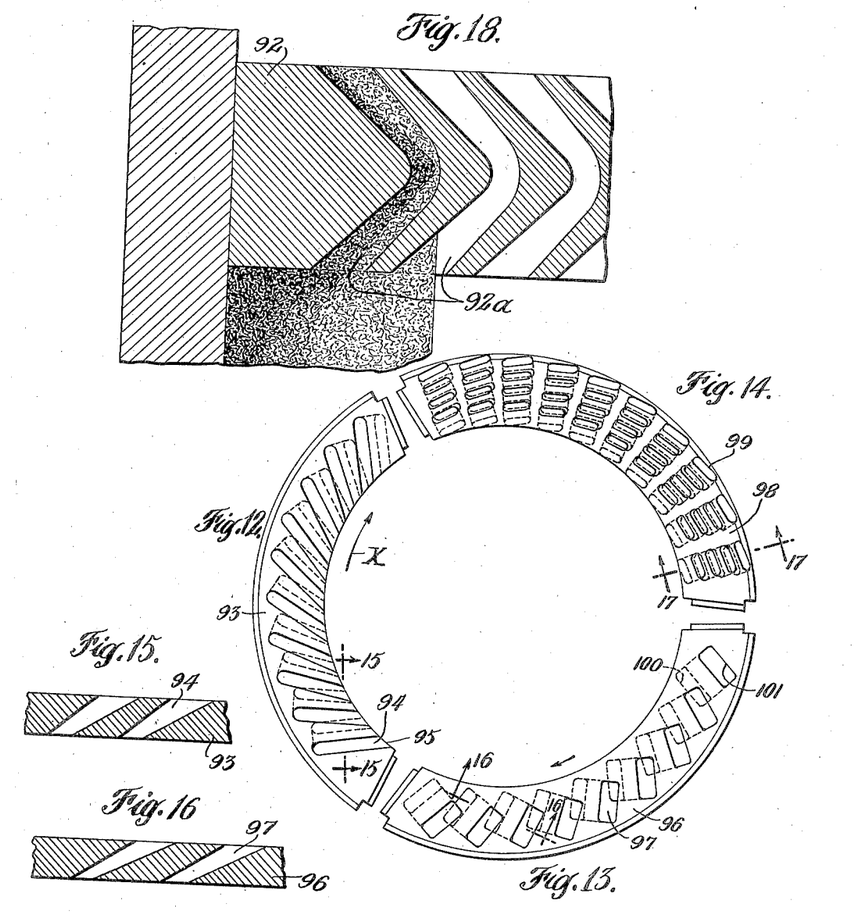
Figures 12, 13 and 14 represent details of additional modifications.
Figures 15, 16 and 17 are fragmentary sectional views taken respectively on the lines 15—15, 16—16 and 17—17 of Figures 12, 13 and 14.
Figure 18 is an enlarged detail of a further modification.

Figure 18 also includes a showing of solids building up in the passages 92a, the heavier stippling as in Figure 3, indicating the heavier solids which will be deposited on the surfaces of the passages furtherest removed from the axis of rotation.

Figures 12, 13 and 14 show three additional modifications of flow passages, these views each illustrating a third section of a ring of the type shown in Figure 6, the three being positioned in end to end relation in a ring, to further illustrate the manner of assembly more fully discussed above in connection with Figure 6.

In Figure 12, and also in the sectional view of Figure 15, the ring 93 is provided with slotlike passages 94 which, instead of being substantially concentric with the ring, as in Figures 4 and 6, are inclined at an acute angle with respect to a radius line of the basket. These passages are also shown as having their inner edges opening through the inner edge of the ring, as at 95.

Figures 13 and 16 illustrate an arrangement somewhat similar to that of Figures 12 and 15, including a ring 96 having passages 97 therein of slotlike shape, although in this case the passages 97 are not of such width as to have an open side at the inner edge of the ring.

Figure 17:
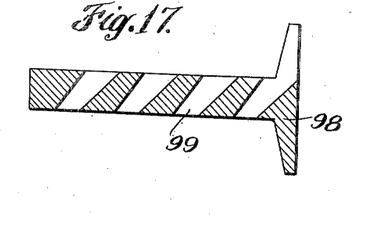

Figures 14 and 17 show still another slot pattern which may be adopted. In this view the ring 98 is provided with groups of passages 99, each group being arranged substantially in a vertical plane containing the axis of rotation of the basket. The slots of this ring, as in Figures 12 and 13, are also inclined slightly in the same sense as slots 97 and 94 of Figures 13 and 12, respectively, although not to as great an extent. In fact, it will be noted from comparison of Figures 12, 13 and 14 that the inclination of the slots as viewed in plan in these figures (with respect to the circumference of the ring) is greatest in Figure 12, least in Figure 14, and at an intermediate value in Figure 13.

Still another feature should be noted in connection with Figures 12 to 17 inclusive, this feature being concerned with another slot inclination which is therein shown. In explanation, reference is made to the general operation of a centrifugal basket of the type here under consideration. The mixed solid and liquid materials are, of course, introduced into the basket during high speed rotation thereof. The general path of flow of the materials in the basket includes an axial component, because of the fact that the material is introduced at the bottom of the basket and the effluent discharged at the top. In addition to this component, the path of flow includes a component which is concentric with the basket, this because the mixed materials are introduced at zero R. P. M. and progressively increase in speed as they are carried along with the basket during its rotation. In effect, therefore, the general path of movement might be described as a spiral, the pitch of which decreases from the bottom to the top of the basket.

Reverting now to the arrangements shown in Figures 12, 13 and 14, it will be noted that an arrow X is applied to these views to indicate the direction of rotation of the basket and the baffles. Bearing in mind that these figures illustrate ring sections in top plan view, and referring specifically to the passage at the extreme right of Figure 13, it will be seen that the inlet opening 100 of the passage (the opening through the lower face of the ring) is offset from the outlet opening 101. A similar offset, although to different degrees, is shown in Figures 12 and 14. The offset in question is such as to incline the passage in a direction approximately conforming to the helical path of travel of the mixed materials during rotation of the basket. This is advantageous since it reduces the degree of turbulence which might otherwise be produced and thus improves separation of the solids from the liquid.

In conclusion it is desired to emphasize certain advantages of a number of features, particularly from the operational standpoint. In the first place, the use of baffles in the centrifugal basket, the baffles having a multiplicity of relatively narrow flow passages therein, materially reduces the depth of liquid through which a large proportion of the solids are caused to travel during separation thereof under the influence of centrifugal force. This provides more thorough solids separation within a given time and therefore reduces the detention period necessary for a given degree of solids separation (the period from the time of introduction of the material to the time of discharge of the effluent).

Still further the provision of perforated baffles of the character described greatly extends the flow path of the materials passing through the basket in a given detention period.

The foregoing important advantages and also others which are more fully discussed hereinbefore are further accomplished in a manner which provides a maximum increase in flow path and maximum length of shallow passages, combined with minimum restriction of the total effective volume of the basket for receiving separated solids.

With further reference to the increase in the flow path of material traveling through the basket, it should be noted that the total volume of the baffle means is preferably kept appreciably less than half of the available volume in the basket for the building up of solids. In the embodiments illustrated the baffles occupy less than one-quarter of the available solids receiving space. However, even with baffle means as herein disclosed occupying only a small fraction of the total available solids space, the path of flow of the materials through the basket is even greater than would be the case were no baffles provided. This is highly important from the standpoint of overall efficiency.

As a result of the foregoing the improvements of this invention greatly increase the overall efficiency of a unit of given size, this being particularly important since for practical purposes the size of the basket must be restricted to within certain limits, particularly as to diameter, in order to maintain the proper factor of safety. In effect, the capacity of a centrifugal separating machine is very materially increased by my invention.

I claim:

1. Apparatus of the character described including a rotatable centrifugal basket on the inside wall of which solids are deposited in operation, a baffle ring projecting inwardly from the inner wall of the basket and dividing the basket into chambers, and mechanism for removing solids from the basket wall including scraper means movable toward and away from said wall and divided into sections projecting respectively into said chambers, the sections of the scraper means further being provided with teeth of different width as between sections.

2. Apparatus of the character described including a rotatable centrifugal basket on the inside wall of which solids are deposited in operation, a baffle ring projecting inwardly from the inner wall of the basket and dividing the basket into chambers, and mechanism for removing solids from the basket wall including scraper units located at different points about the axis of the basket, each unit including a scraper divided into sections adapted to project into the respective chambers in the basket, means for moving the scraper sections toward and away from the wall of the basket, and teeth on the sections for one chamber being of different width from the teeth on the sections for another chamber, and the teeth on the two sections in one chamber being staggered with respect to each other.

JOSEPH S. PECKER.